United States Patent Office 2,761,875
Patented Sept. 4, 1956

2,761,875

CHLOROFLUOROACRYLIC ACIDS

George Green Stoner, Easton, Pa., assignor to General Aniline & Film Corporation, New York, N. Y., a corporation of Delaware No Drawing. Application June 1, 1953,
Serial No. 358,946

4 Claims. (Cl. 260—539)

This invention relates to chlorofluoroacrylic acids which are valuable intermediates in organic synthesis.

It is the object of the present invention to provide chlorofluoroacrylic acids which are useful intermediates for the preparation of a variety of new chemical compounds having new uses in agriculture and industry.

I have discovered that chlorofluoroacrylic acids which are characterized by the general formula,

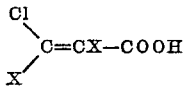

wherein at least one X represents fluorine and the other X represents either chlorine or fluorine, are particularly useful in chemical synthesis for the preparation of amides, esters and various salts having new uses in agriculture and chemical industry. The unusual feature of the chlorofluoroacrylic acids is that they may be stored without loss from spontaneous polymerization. This unusual and unexpected property is attributable to the presence of at least one chlorine atom in the terminal carbon atom but not more than two fluorine atoms in the acrylic acid chain. This feature not only increases the stability of the compounds but also permits the preparation of esters of chlorofluoroacrylic acids and unsaturated alcohols to yield monomers which are easy to handle and to store.

The chlorofluoroacrylic acids characterized by the foregoing general formula are prepared by allowing a hexahalogenopropene to react with anhydrous sulfuric acid or with an organic sulfonic acid, followed by hydrolysis. Essentially three moles of hydrogen halide are evolved per mole of hexahalogenopropene. In general, the reaction is illustrated as follows:

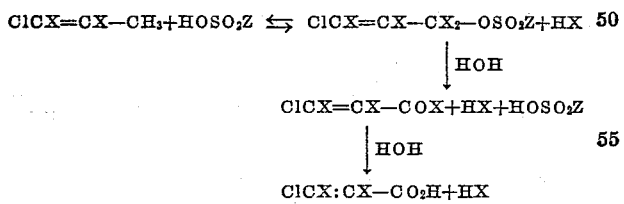

wherein at least one of the H's represents chlorine or fluorine and the remaining X's may differ from one another and represent either chlorine or fluorine, and Z represents hydroxy, chlorine, or an organic radical of a sulfonic acid. When Z represents hydroxy, the intermediate product is pentahalogenoallylsulfuric acid, when Z represents chlorine, it is the sulfuryl chloride, and when Z represents the organic radical of a sulfonic acid, the compound is a pentahalogenoallyl ester of the particular sulfonic acid used in the reaction. The intermediate is then hydrolyzed into the desired trihalogenoacrylyl acid, presumably through the corresponding trihalogenoacrylyl halide. During the hydrolysis, it is to be observed that when Z represents chlorine, then two additional moles of water will be required to hydrolyze the chloro- or fluorosulfonic acid into hydrochloric and sulfonic acid.

A convenient method of preparing the required hexahalogenopropenes, which are characterized by the formula,

wherein X represents chlorine or fluorine, is by the dehydrohalogenation of the heptahalogenopropane having the general formula,

wherein X represents either chlorine or fluorine. The best method is by the action of a base (dissolved in a lower alcohol) on a 1,1,1,2,2,3,3-heptahalogenopropane of the type HCXCl—CX$_2$—CX$_3$, wherein X represents either chlorine or fluorine. The heptahalogenopropanes are usually prepared by catalytic addition of a suitable trihalogenomethane to either tetrafluoroethylene or chlorotrifluoroethylene. The latter two compounds are produced commercially on a large scale and can be obtained by dechlorination of either Freon 114 (ClCF$_2$—CF$_2$Cl) or Freon 113 (Cl$_2$CF—CF$_2$Cl), respectively, both of which are commercially available products.

The anhydrous sulfuric acid (SO$_3$ monohydrate, 98–102% sulfuric acid), chlorosulfonic acid, methanesulfonic acid, ethanesulfonic acid, or a mixture of methanesulfonic acid and ethanesulfonic acids, and the like are better solvents for the hexahalogenopropenes than diluted sulfuric acid, even of 90% or 96% sulfuric acid. Sulfuric acid containing dissolved sulfuric monohydrate, i. e., fuming sulfuric acid or oleum, is undesirable since such material increases side reactions in which phosgene and chlorine are formed and the yield of the desired trihalogenoacrylic acid is decreased accordingly.

As a consequence of the strong solvent powers of 100% sulfuric acid, chlorosulfonic, methanesulfonic acid, and the like on hexahalogenopropenes, the process of preparing the chlorofluoroacrylic acids in accordance with the present invention is considerably more rapid and economical than procedures used previously for making trichloroacrylic acid.

In the hydrolysis of the intermediate, i. e.,

as shown in the above reaction formulas, hydrogen halide is liberated almost as rapidly as water is added. The resulting trihalogenoacrylic acid is readily separated on cooling the diluted reaction mixture. If the melting point of the particular product involved is then lowered to the cooling temperature, the product is obtained in crystalline form fairly pure and readily isolated by filtration. The whole process involves only a matter of minutes instead of hours.

The following table illustrates examples of 1,1,1,-2,2,3,3-heptahalogenopropanes which are dehydrohalogenated to the corresponding hexahalogenopropenes and the resulting chlorofluoroacrylic acids then are obtained by hydrolysis of the hexahalogenopropenes.

| 1,1,1,2,2,3,3-Heptahalogenopropane ClCHX—CX₂—CX₃ | Dehydrohalogenation Product, Hexahalogenopropene, ClCX=CX—CX₃ | Resulting Chlorofluoroacrylic Acid 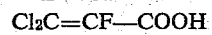 |
|---|---|---|
| Cl₂CH—CFCl—CF₂Cl | Cl₂C=CF—CF₂Cl | Cl₂C=CF—CO₂H |
| Cl₂CH—CF₂—CF₂Cl | Cl₂C=CF—CF₂Cl | Cl₂C=CF—CO₂H |
| Cl₂CH—CF₂—CFCl₂ | Cl₂C=CF—CFCl₂ | Cl₂C=CF—CO₂H |
| Cl₂CH—CF₂—CCl₃ | Cl₂C=CF—CCl₃ | Cl₂C=CF—CO₂H |
| Cl₂CH—CFCl—CF₃ | Cl₂C=CF—CF₃ | Cl₂C=CF—CO₂H |
| ClCHF—CCl₂—CCl₃ | ClCF=CCl—CCl₃ (Cis and trans isomers) | ClCF=CCl—CO₂H (Cis and trans isomers) |
| (Cl₂CF—CFCl—CF₂Cl+Zn) |  (Cis and trans isomers) |  (Cis and trans isomers) |
| ClCHF—CF₂—CFCl₂ | 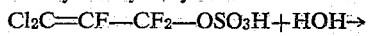 (Cis and trans isomers) |  (Cis and trans isomers) |
| ClCHF—CF₂—CF₂Cl | ClCF=CF—CF₂Cl (Cis and trans isomers) | ClCF=CF—CO₂H (Cis and trans isomers) |
| ClCHF—CFCl—CF₂Cl | ClCF=CF—CF₂Cl (Cis and trans isomers) | ClCF=CF—CO₂H (Cis and trans isomers) |

In order to disclose the invention in more detail, the following examples are furnished, it being understood however, that these examples are illustrative only and are not intended to be limitative.

EXAMPLE I $Cl_2C=CF—COOH$

*β,β-Dichloro-α-fluoroacrylic acid*

A 200-ml., 3-neck flask, equipped with stirrer, thermometer, condenser (leading over 50% NaOH), and dropping funnel, was charged with 39.2 grams (0.4 mole, 300% excess) of SO₃ monohydrate and 20 grams (0.1 mole) of 1,1,3-trichloro-2,3,3-trifluoropropene. The mixture was heated until virtually no more refluxing of the trichlorotrifluoropropene was occurring, which required 85 minutes. During that time, the temperature of the reaction mixture increased from 85° C. to 135° C. and the hexahalogenopropene dissolved as hydrogen chloride was evolved. The solution was heated on a steam-bath for an additional 80 minutes.

$Cl_2C=CF—CF_2Cl + H_2SO_4 \rightarrow$
$Cl_2C=CF—CF_2OSO_3H + HCl$

Then 5.4 ml. (0.3 mole, 50% excess) of water was added dropwise. Each drop produced a burst of HF until about 0.2 mole of water had been added, at which time the 3,3-dichloro-1,1,2-trifluoroallylsulfuric acid was mostly all hydrolyzed.

$Cl_2C=CF—CF_2—OSO_3H + HOH \rightarrow$
$Cl_2C=CF—CO_2H + HF$

The flask was immersed in ice-water while 32.4 ml. (1.8 moles) more of cold water was added slowly. This exothermic reaction diluted the solvent to about 55% sulfuric acid, from which β,β-dichloro-α-fluoroacrylic acid crystallized promptly as stirring and cooling were continued. After filtering and drying, the yield was 14 grams (88% of the theoretical value). After crystallization from water, followed by desiccation, the white crystals melted at 68° C. An acid number of 354 mg. of KOH/gram was found, as compared with the theoretical value of 353 mg. of KOH/gram.

Because of steric hindrance, this unsaturated compound does not react with Wijs reagent (ICl in acetic acid). The β,β-dichloro-α-fluoroacrylic acid is readily esterified, as with, for example, 2-butoxyethanol or with methyl alcohol to yield fire-retarding esters useful as plasticizers for various plastics. The β,β-dichloro-α-fluoroacrylamide is readily prepared by passing gaseous ammonia into a solution of methyl β,β-dichloro-α-fluoroacrylate in methyl alcohol to yield solvents for acrylic polymers.

EXAMPLE II $ClCF=CCl—COOH$

*α,β-Dichloro-β-fluoroacrylic acid*

Example I was repeated with the exception that 23 grams (0.1 mole) of 1,2,3,3,3,-pentachloro-1-fluoropropene, cis and trans $ClCF=CCl—CCl_3$, was used in place of 20 grams (0.1 mole) of 1,1,3-trichloro-2,3,3-trifluoropropene. At the end of the process, 13 grams of α,β-dichloro-β-fluoroacrylic acid separated. This was 82% of the theoretical yield. It was a mixture of cis and trans isomers represented by the following structures:

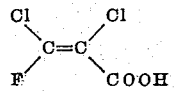

and

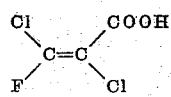

Presumably because the bulkiness of the two chlorine atoms blocked reaction at the double bond, the theoretical iodine number could not be obtained with Wijs reagent (ICl in acetic acid).

α,β-Dichloro-β-fluoroacrylic acid was condensed with aminoalkanols such as for example, 2-aminoethanol, and yielded derivatives which are particularly useful in agriculture not only as fungicides or herbicides but also as defoliating agents and as insecticides. By acidolysis (acyl interchange) of vinyl acetate, α,β-dichloro-β-fluoroacrylic acid is converted into vinyl α,β-dichloro-β-fluoroacrylate. This vinyl ester can be polymerized, for instance, by using benzoyl peroxide as an initiator. Polyvinyl α,β-dichloro-β-fluoroacrylate is a thermoplastic resin which is useful especially because of its resistance to weathering, relatively high softening point, transparency, and flexibility.

EXAMPLE III

*β-Chloro-α,β-difluoroacrylic acid*

Example I was again repeated, but with the exception that 19 grams (about 0.1 mole) of a mixture of cis and trans isomers of 1,3,3-trichloro-1,2,3-trifluoropropene, $ClCF=CF—CFCl_2$, and 1,3-dichloro-1,2,3,3-tetrafluoropropene, $ClCF=CF—CF_2Cl$, was used in place of 20 grams of 1,1,3-trichloro-2,3,3-trifluoropropene. At the end of the process, 11 grams of β-chloro-α,β-difluoroacrylic acid was obtained (approximately 77% of the theoretical yield). This product was also a mixture of cis and trans isomers represented by the following structures:

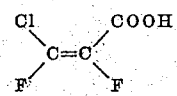

and

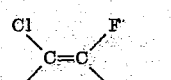

It is to be noted that since the formulas of Examples II and III represent both cis and trans forms, a total of 5 compounds belong to this type.

In general, physical properties of cis-α,β-dichloro-β-fluoroacrylic acid (in which the two chlorine atoms are on the same side with respect to the double bond,

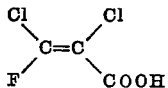

are not identical with those of the trans isomer (in which the chlorine atoms are on opposite sides with respect to the double bond),

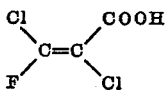

For that reason, physical constants on mixtures of unknown ratios are not of much significance for characterization purposes. The same applies to mixtures of cis and trans β-chloro-α,β-difluoroacrylic acid (in which the two fluorine atoms are either on the same side or opposite sides with respect to the double bond),

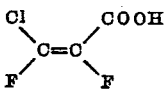

and

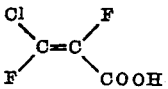

β-Chloro-α,β-difluoroacrylic acid is more valuable as an intermediate in the forms of its esters and amides. The lower esters generally are interpolymerizable with other co-monomers, such as maleic anhydride. Another type of useful synthetic resin based on β-chloro-α,β-difluoroacrylic acid is obtained through the vinyl ester. Vinyl β-chloro-α,β-difluoroacrylate can be converted to a thermoset polymer, cross-linked polyvinyl β-chloro-α,β-difluoroacrylate, which has utility because it is remarkably flame-resistant and solvent-resistant.

This application is a continuation-in-part of my application Serial No. 245,077, filed on September 4, 1951, now abandoned.

While I have pointed out above certain preferred embodiments of the invention, the same is not limited to the foregoing examples or to the specific details given heretofore but is capable of variations and modifications as to proportions and conditions employed. Accordingly, it is intended that the invention be defined only by the accompanying claims.

I claim:
1. Chlorofluoroacrylic acids characterized by the following general formula:

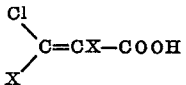

wherein at least one X represents fluorine and the other X represents a number selected from the class consisting of chlorine and fluorine.

2. β,β-Dichloro-α-fluoroacrylic acid having the following formula:

3. α,β-Dichloro-β-fluoroacrylic acid having the following formula:

4. β-Chloro-α,β-difluoroacrylic acid having the following formula:

References Cited in the file of this patent
UNITED STATES PATENTS 2,425,426    Joyce               Aug. 12, 1947
2,668,182    Miller              Feb. 2, 1954

OTHER REFERENCES

Mabery et al.: Beilstein (4th ed.), vol. II, p. 403.